March 24, 1931. J. LEDWINKA 1,797,917
PRESSED METAL AUTOMOBILE BODY
Filed Oct. 29, 1926  4 Sheets-Sheet 1
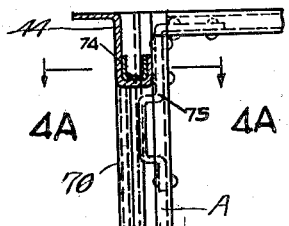
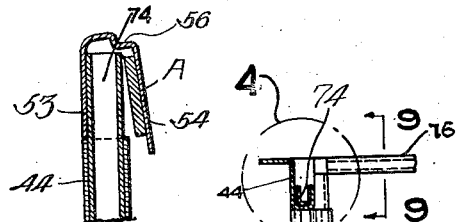
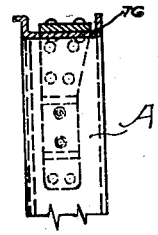
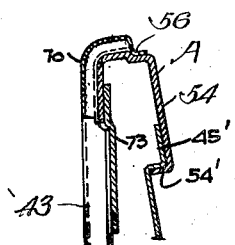
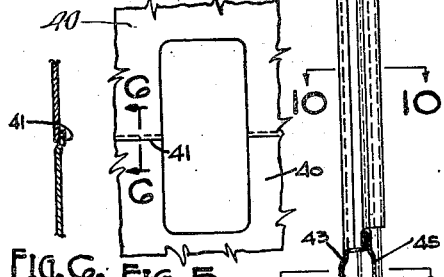
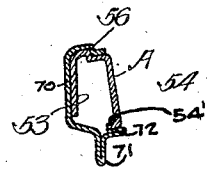
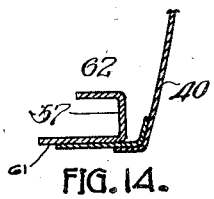
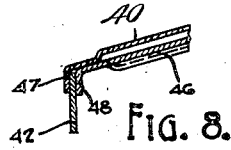
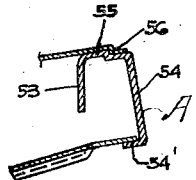
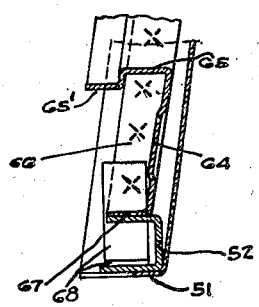
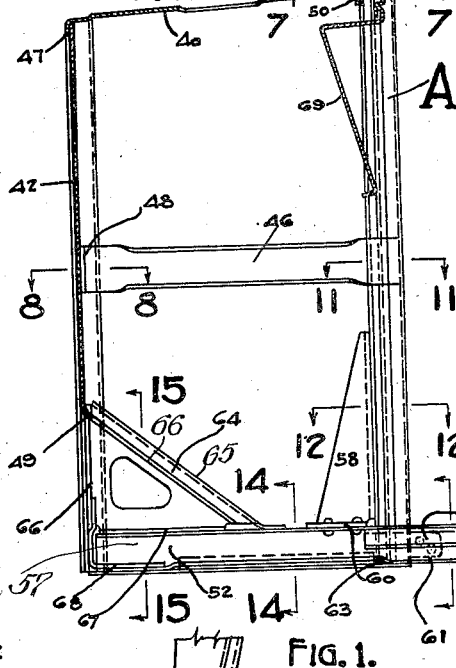
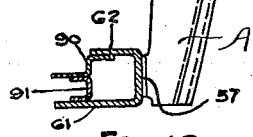
INVENTOR.
JOSEPH LEDWINKA.
BY
John R. Tarbox
ATTORNEY.

March 24, 1931. J. LEDWINKA 1,797,917
PRESSED METAL AUTOMOBILE BODY
Filed Oct. 29, 1926 4 Sheets-Sheet 2
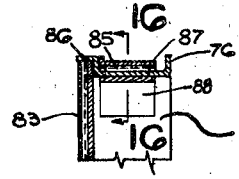
FIG. 17.
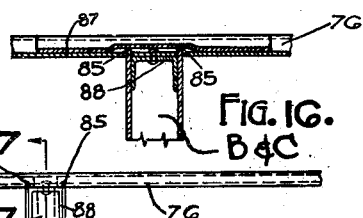
FIG. 16.
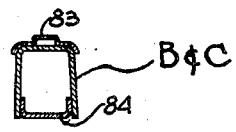
FIG. 18.
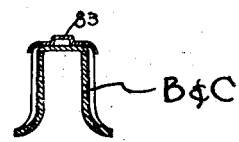
FIG. 20.
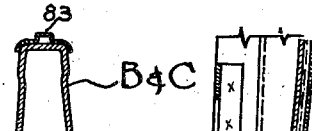
FIG. 19.
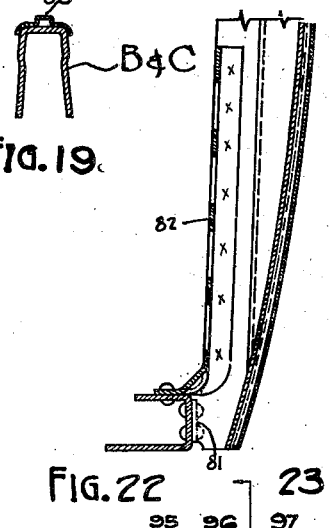
FIG. 22
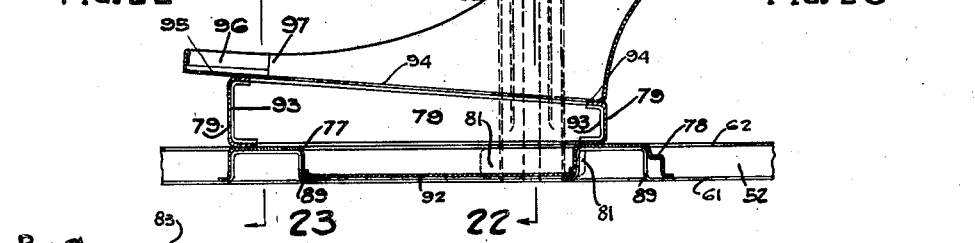
FIG. 23
FIG. 2.
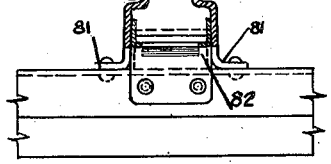
FIG. 21.
INVENTOR.
JOSEPH LEDWINKA.
BY
John P. Paxton
ATTORNEY.

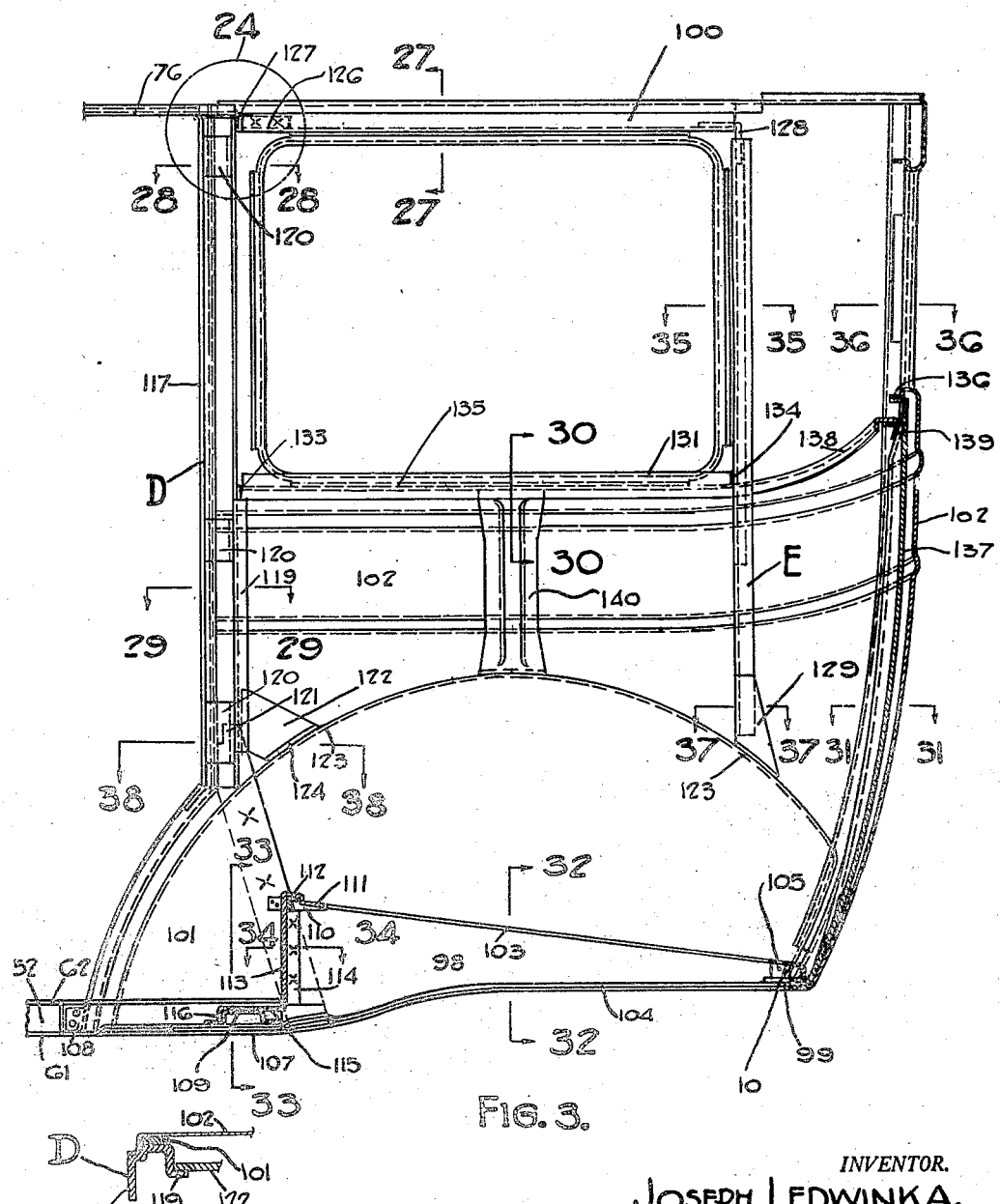

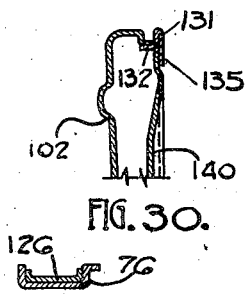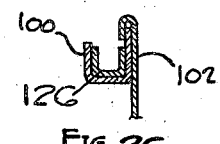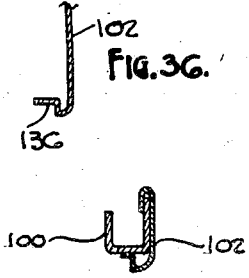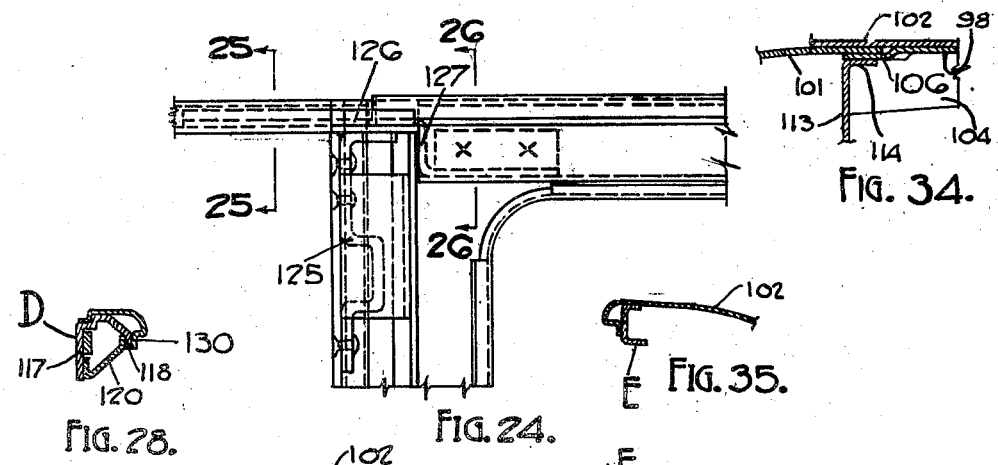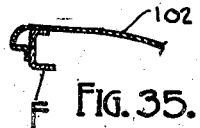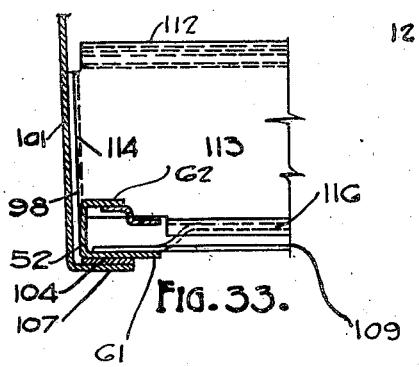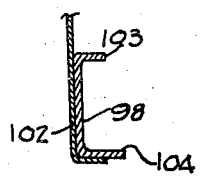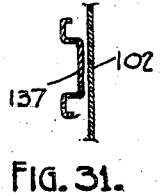

Patented Mar. 24, 1931

1,797,917

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED-METAL AUTOMOBILE BODY

Application filed October 29, 1926. Serial No. 145,071.

This invention relates to automobile bodies made of pressed metal and, more particularly, to bodies of this class of the closed type.

The aim of automobile body engineers has been for some time directed to the reduction of the weight of such bodies without sacrifice in strength, to the elimination of bulky posts in closed cars which obstruct vision of the occupants, to the reduction and simplification of the number of parts going into the manufacture of such bodies, to the simplification of the joints without sacrifice of strength, to the formation of the various parts to permit ready assembly in unit assemblies which can be readily joined in the final assembly by complemental joint formations which when united, provide a complete body structure of great strength and rigidity, and which is especially adapted to take the strains and stresses to which such bodies are subjected in use.

The efforts of the engineers along these lines has shown that a body of metal stampings and, particularly, a body of sheet steel stampings, is peculiarly adapted for the attainment of these and other ends, and it is the general object of the present invention to provide a construction of body made of sheet steel stampings whereby these various aims are fulfilled in a very high degree.

Other and further objects and advantages will become apparent from the following detailed description taken with the accompanying drawings in which, Figs. 1, 2 and 3 show, respectively, the cowl section, the central section and the tonneau section of my improved pressed metal body in central vertical longitudinal section;

Fig. 4 shows an enlarged detail of the parts within the circle 4 of Fig. 1;

Fig. 4a shows a section through the joint between the peak panel and A post along the line 4a—4a of Fig. 4;

Fig. 5 is a detail plan view of the top of the cowl;

Fig. 6 is a detail sectional view on the line 6—6 of Fig. 5;

Figs. 7 to 15 are detail sectional views taken on the correspondingly numbered lines of Fig. 1;

Fig. 16 is a detail sectional view on the line 16—16 of Fig. 17;

Figs. 17 to 23 are detail sectional views taken, respectively, on the correspondingly numbered lines of Fig. 2;

Fig. 24 is an enlarged detail view of the parts shown within the circle 24 in Fig. 3;

Figs. 25 and 26 are detail sectional views on the correspondingly numbered lines of Fig. 24;

Figs. 27 to 38 are detail sectional views taken on the correspondingly numbered lines of Fig. 3.

In the drawings similar reference numerals refer to similar parts in the several views, and the sectional views appear as if viewed in the direction of the arrows at the ends of the section lines.

The automobile body structure of the sedan type selected for illustration of one embodiment of this invention, comprises a cowl unit shown generally in Fig. 1, an intermediate unit shown generally in Fig. 2 and a tonneau unit shown generally in Fig. 3, which units are adapted to be finally assembled to form the completed body.

The cowl unit consists generally of the cowl panel 40, the A posts extending from the bottom of the body to the roof and connected to the opposite rear edges of the cowl panel, the shroud pan 42, the lower windshield header 43 joined to the rear edge of the cowl panel and the A posts, the peak panel 44 joining the tops of the A posts, the instrument board support 45 and the side braces 46 extending between the A posts and the forward side edges of the cowl panel and shroud pan.

The cowl panel, as shown, is made in two pieces joined at the lap, as at 41 by a top joint, the lapped edges being welded together. It is formed at its forward edge with an inward offset to receive the rear edge of the hood, and at the front of said offset, with an inwardly extending flange 47. The side and top edges of the shroud pan 42 fit against and are welded to the flange 47. The side braces 46 are also flanged inwardly at their forward ends as at 48, Fig. 8, and the three thicknesses of metal so formed by the cowl panel, shroud pan and brace flange 48 are welded or otherwise rigidly secured together. The shroud pan is cut away at the lower central portion, the upper edge of the opening so formed being flanged inwardly and downwardly, as at 49.

Along its upper rear edge the cowl panel is formed with an inward flange 50 which is joined to the forward downwardly extending arm of the Z section header 43 as by welding. The cowl panel is flanged inwardly at 51 along its bottom edges, these flanges being lapped under and secured, as by welding, to the bottom flanges of the side sills 52.

The A posts are of substantially channel section throughout, the channel presenting inwardly and comprising the front side wall 53, the rear side wall 54 and the bottom wall 55. The bottom wall is provided with a rabbet along its rear edge for the reception of the usual door overlap. The rear side edges of the cowl panel are correspondingly offsets at 56 to fit within the offset on the posts in which they are secured, as by spot welding. This provides a neat and strong joint between cowl panel and A post.

The A posts extend downwardly on the outside of the sill having their lower ends flush with the bottom of the sill. Each post has a rearwardly extending tab or flange secured as by riveting or welding to the bottom wall of the adjacent sill 52. To further strongly brace and secure the bottom of the A post to the sill a triangular bracket stamping 58 is secured through an outwardly projecting flange 59 at its rear vertical edge to the forward wall of the post and through an inwardly projecting flange 60 along its horizontal edge to the top of the sill 52. The bracket may be secured to the post by welding and to the sill by riveting, as shown. To still further anchor the post to the sill and reinforce the lower portion thereof, a channel member 58' is nested within the side walls 53, 54 and secured thereto as by welding. The bottom of this channel is extended beyond the sides and bent inwardly at 58'' to overlie the top of the sill to which it is secured by rivets.

That portion of the sill which extends forwardly into the cowl has the greater portion of its lower side flange 61, which is wider than the upper flange 62, offset upwardly to receive in the offset a plate 63 flanged upwardly at its outer edge to follow the contour of the bottom of the cowl panel. In this region the cowl panel is flanged under and secured to this plate instead of to the sill directly. This construction makes it unnecessary to bend the sill to the precise contour of the lower edge of the cowl. The forward end of the sill extends into proximity to the shroud pan 42 and a combined bracket and toe board support 64 having a body of generally right triangular shape joins the end of the sill to the forward reinforced edge of the cowl. This bracket has flanges 65, 67, 66 extending inwardly from its body on its rearwardly and downwardly inclined top edge, its horizontal bottom edge and its vertical front edge, respectively, the latter two being secured respectively, to the top side wall 62 of the sill and to the overlapping portion of the shroud pan 42 and inturned cowl panel flange 47. The inner portion 65' of the flange 65 is offset downwardly in line with the flange 49 of the shroud pan and provides a seat for the end of the toe board (not shown). This construction provides a very secure joint between the sill and the front of the cowl unit but additional strength is attained by securing one arm of an angle bracket 68 to the lower flange 61 of the sill and having part of its other arm lying against and secured to the shroud pan and a further offset part of said other arm lying against the inside of flange 66 of the toe board support bracket and secured thereto as by welding. This laminated metal joint at the forward lower edges of the cowl provides a very strong construction at this point.

The rear side wall 54 of the A post is provided, as shown in Figs. 7, 10, 11 with a forwardly extending flange 54' which serves not only to strengthen the post but also as a convenient means for the securing of other body elements. For example, as shown in Fig. 11, the brace 46 has its rear edge overlapping the inner side wall of this flange 54' and is secured thereto by welding or otherwise. Also, the instrument board supporting stamping 45 has its ends offset as at 45' to nest within the angle formed by the side wall 54 and flange 54' of the post. To form a strong box girder construction the upper edge of the instrument board support is clinched over the inner upwardly extending arm of the header 43 of Z cross section, while the lower edge is provided with a forwardly offset flange, Fig. 1, to which is secured the instrument board stamping 69. At the ends, this stamping may be additionally supported from the A posts in any suitable manner, as desired.

Above the belt line the A post has applied to it, as shown in Fig. 10, the paneling which closely hugs the outside and forward walls of the post and closes the inner open side of the channel to provide finish and a side of the frame for the windshield. To this latter end the paneling is bent back upon itself at 71 and then rearwardly flanged and again bent back upon itself at 72, to form a smooth edge surface and finish. Along this bent back edge 72 it is secured, as by welding, to the flange 54' of the post.

The header 43 is formed with a bead, and the paneling 70 in the region of the header is similarly beaded to merge the bead of the header continuously into the bead on the door (not shown). The end of the header abuts the inner edge of the paneling 70, as shown in Fig. 7, and is secured to the post by an offset plate 73 welded to the inner sides of the end of the header and the forward wall of the A post, respectively.

The substantially channel shaped peak panel 44 having the forwardly extending flange at its upper end connects the A posts at the top and is secured thereto by a channel shaped bracket 74 nested, as shown in Figs. 4 and 4a within the ends of the channel 44 and secured thereto and extending beyond the ends of the channel to fit against and be secured to the inner sides of the forward flanges 53 of the A posts.

As shown in Figs. 4 and 9, the cowl unit is securely joined at the top to the intermediate unit by means of angle brackets 75 each having one of its arms extending vertically within the hollow A post and secured thereto as by riveting. This arm is provided with an offset portion to receive the hinge strap. The horizontal arm overlies the bottom wall of the channel section top rail 76 of the intermediate unit and is secured thereto by rivets and/or welding.

The intermediate units comprise generally the side sills 52 of inwardly presenting channel form, the B—C posts erected thereon, the top rails 76 secured to the upper ends of the B—C posts, the cross braces 77 and 78 connecting the sills, the front seat supporting framework 79 and the front seat 80.

As hereinbefore described, the side sills extend forwardly into the cowl unit and are strongly secured thereto in final assembly. They extend rearwardly for connection to the tonneau unit in the region of the D post as will presently be described.

The B—C posts are of channel form, the channel presenting inwardly and, as in the case of the A posts, they are secured to the bottom wall of the sill 52 by laterally extending flanges or tabs 81 at front and rear similar to the flanges 57 on the A posts. They are additionally secured to the sills by channel brackets 82 nesting within the lower end of the posts and connected thereto and to the sills in a manner entirely similar to the connection of the channel brackets 58' at the A posts. The sections of the B—C posts are clearly indicated in Figs. 18, 19, 20 and 21. From these figures, it will be seen that the posts are of decidedly diminished cross section in their upper portions, thereby affording a very large range of vision. In their lower portions they are rabbeted as shown in Fig. 21 to cooperate with a correspondingly shaped door rail to form door stops. A panel strip 83 is applied to the bottom wall of the B—C door posts, the strip being offset outwardly and spaced from the bottom wall at the center to provide rabbets at the front and rear sides of said offset portion, which receive the door overlaps. For greater strength and neatness the edges of the strip 83 are carried around the rounded front and rear outer corners of the posts. These strips are secured by welding or otherwise. Near the top of the posts, as shown in Figs. 2 and 18, the posts are reinforced by a channel shaped brace 84 nested between the front and rear side flanges of the posts and secured thereto.

A very secure joint is provided between the top of the B—C post and the top rail 76. To this end, the bottom wall of the channel top rail is transversely slotted and the side walls of the post are provided with upward extensions 85 fitting said slots, while the bottom of the channel is carried upwardly to overlap the outside wall of the channel top rail 76 and abut the outwardly extending flange 86 at the upper edge of the outer side of the channel. The panel strip 83 is also carried up to abut this flange 86. A U-shaped reinforcing bracket 88 has its sides welded to the sides of the post and the bottom riveted to the bottom of the top rail. Further strength of the joint is attained by the strap 87 which has a central offset portion bridging the extensions 85 of the post projecting through the slots in the bottom of the channel top rail, and the ends thereof lie flush with and are welded to the inside surface of the bottom of the top rail 76.

The front seat structure is supported from cross braces of inverted channel section 77 and 78 having the side edges of the channel flanged laterally. These channels are not directly secured to the sills, as shown in Figs. 2 and 23. They telescope over and are secured to corresponding inverted channel shaped brackets 89, which have their lateral flanges upwardly offset to permit the ends of the bracket to enter between the sill flanges into substantial abutting relation to the bottom wall thereof. They are secured to the sill by riveting the lateral flanges to the lower side flange 61 of the sill and by welding or otherwise securing the bottom of the channel to the upper side wall 62 of the sill. The bottom wall of the cross members 77, 78, when assembled, fit the bottom walls of the brackets 89 and the lateral flanges of the cross members overlie the lateral flanges of the brackets and are riveted thereto. Thus, a construction is provided which insures a strong joint between the side sills yet allows the cross members to be readily applied, if desired, after the side units consisting of a sill, B—D post and top rail have been separately assembled in place. The rear cross brace 78 is provided at its upper rear edge with a rabbet to receive the edge of the floor board for the tonneau section.

Both in advance of the forward cross member 77 and between the rear cross member 78 and the rear seat heel board, the sills are provided with means for supporting the sides of the flooring. This means has been omitted from most of the figures of the drawings showing the sills for the sake of clearness, but in the section of Fig. 13, it is clearly shown as comprising a Z shaped stamping 90 having one arm of the Z welded to the inside of the top flange 62 of the side sill, the web and the other arm of the Z forming the rabbet to receive the edge of the floor board. Channel-shaped supporting brackets, such as 91, are provided at intervals between the Z shaped stamping 90 and the lower side wall 61 of the sill.

The lower seat pan stamping 92 is supported by and secured to the adjacent lateral flanges of the forward and rear cross braces 77 and 78.

The front seat back is supported from the cross braces 77 and 78 and the side sills by a substantially rectangular box structure 79 the four sides of which are each made out of inwardly presenting channel stampings suitably secured together at the corners. The channel forming the rear side is of less height than the forward channel and the side channels taper from front to rear. The front and rear channels of the box structure 79 rest on and are secured to the cross braces 77 and 78, respectively, while the side channels rest on and are secured to the side sills as appears in Figs. 2 and 23. These channel sides of the box structure 79 are reinforced at front and rear by braces 93 nesting within the channels and arranged at suitably spaced points.

The seat back stamping 80 is curved to form the sides and back of the seat and is provided at the bottom with a flange 94 seated on and secured to, as by welding, the upper sides of the channeled sides of the box structure 79. To form the front portion of the seat structure, a stamping having a bottom portion 95 in the same plane as the flanges 94 of the seat back 80 and resting on and secured to the top flange of the forward side of the box structure 79 is provided, this portion having its side edges curved rearwardly to merge into the side edges of the seat back panel 80. This stamping has a vertically extending edge flange 96 bent back upon itself for reinforcement. The rear edges of this stamping and the forward edges of the seat back panel abut each other as indicated at 97 and are welded together at the lines of juncture.

The tonneau unit includes as principal component elements thereof, the tonneau side sills 98, the tonneau rear sill 99, the D-posts, the tonneau side top rails 100, the E posts along the rear edges of the tonneau side window openings, the post D bracket 101, all of which are interconnected by the tonneau paneling designated generally by the reference numeral 102.

The tonneau side sills 98 are, in the present embodiment of the invention, of channel cross section, the channel presenting inwardly, as shown in Fig. 3. The channel has the top side wall 103 and the bottom side wall 104 and has a very much wider web or bottom wall at the front than at the rear. Thus, the downwardly and rearwardly inclined top side flanges 103 serve with the similarly inclined top flange 105 of the channel shaped rear cross sill connecting the rear ends of the side sills as a rear seat supporting structure.

At the front, the tonneau side sills are joined to the post D bracket 101 which comprises an inwardly offset portion corresponding to the contour of the wheel housing and a forward edge portion of channel cross section, the channel presenting inwardly. The rear edge of the inwardly offset portion of the bracket 101 is rearwardly and downwardly inclined. At its forward end, where the vertical web of the side sill overlaps the rear inclined edge of the post D bracket, it is inwardly offset at 106 as shown in Fig. 34 and is welded thereto. The post D bracket is flanged inwardly at 107 along its lower edge and the lower side wall 104 of the side sill is extended forwardly beyond the end of the vertical web to overlap this flange 107 of the bracket 101 a substantial extent. These overlapped parts are securely joined as by welding. The body side sill 52 telescopes within the post D bracket a substantial extent, in fact, almost to its rear edge as appears from the showing in Figs. 3 and 33, and it (the sill) is contoured to nest close within the angle formed by side and bottom flange 107 of said bracket 101. To this end its bottom side wall 61 is offset upwardly where it overlaps the flange 104 and 107 of the tonneau side sill and the post D bracket, respectively. These overlapping parts are all securely united by welding to form an exceedingly strong joint at the D post bracket. The forward edge of the D post bracket 101, which edge is curved to correspond to the wheel housing and is provided with a rabbet in its channel section portion to receive the door overlap is provided at the bottom with a tab or flange 108 which lies against the outside or bottom wall of the channel sill and is secured thereto by rivets, thereby further securing the joint.

A cross member 109 of inverted channel shape connects the rear ends of the side sills 52. The upper forward portions of the tonneau side sills 98 are cutaway as shown at 110, Fig. 3, and are adapted to receive a rearwardly and downwardly extending downwardly offset portion 111 of the rearward flange 112 formed at the upper edge of the vertical body 113 of the heel board. Offset portion 111 is in line with the flanges 103 and 105 of the side and rear sills, respectively, and thus also serves as a part of the seat supporting structure. The vertical body portion 113 of the heel board has rearwardly extending flanges 114 which are welded to the vertical webs of the tonneau side sills 98. From the lower edge of the vertical portion 113, the heel board is extended forward horizontally as at 115 to provide a support for the flooring, this portion 115 resting on the cross brace 109 and being flanged down at 116 into the angle formed by the laterally extending flange with the forward wall of the channel cross brace, 109. A transverse angle brace 116′ nests within the angle formed at the forward edge of the heel board to support the same along the edge. This brace has tabs 116″ at its ends welded to the post D brackets whereby to secure it in place.

The D post erected on the post D bracket is, as shown in Figs. 3, 28 and 29, of substantially channeled shape the mouth of the channel presenting inwardly, as in the case of the A and B—C posts. A rabbet is shown formed in the forward outside edge to receive the door overlap. The forward side wall 117 of the channel is considerably wider than the rear side wall 118. Below the belt line, the rear side wall is formed with a rearwardly extending flange 119. The channel is reinforced at spaced points by channel reinforcements 120 nested between the side walls 117 and 118 and secured thereto. These reinforcements may also serve to secure the interior trim.

At the bottom the D post is anchored firmly to the top of the post D bracket 101, the upper narrow portion of the bracket lying outside the rear portion of the D post and being secured thereto. Also, the wide forward side wall 117 of the D post is extended downwardly beyond the body thereof and bent to lie against and be secured to the forward side wall of the channel section forward edges of the post D bracket. To secure additional anchorage, a bracket 122 extends between the shoulder 123 formed by the wheel housing offset in the tonneau paneling 102 and the bottom portion of the D post. This bracket is flanged and secured as by welding at 124 to the shoulder 123 and its opposite end is welded to the back of the flange 119 of the D post.

At the top the D post is securely connected to both the forward top rail 76 and the tonneau side top rail 100. The top rail 74 has its rear end overlying the top of the post and secured thereto by welding, and also by an angle bracket 125 having its vertical arm which is offset to accommodate a hinge strap, secured to the inside surface of the forward wall of the post by rivets, and its upper horizontal arm riveted to the under side of the bottom wall of the channel rail 76. The tonneau side top rail channel also has a portion overlying the post and secured thereto as by welding, but its main portion ends in an abutting relation to the rear surface of the post, and because of its deeper channel section, the bottom wall of the channel rail 110 is offset downwardly below the bottom wall of the channel rail 76. To secure these offset portions to it, a reinforcing strap 126 is provided, this strap having two offset channel portions nested, respectively, in the channels of the respective rails and spot welded thereto. The portion 127 connecting these offset portions lies flat against the rear wall of the D post and is preferably secured thereto to render the joint still more rigid.

The top rail 100 extends rearwardly to the E post which is of channel section in its upper portion, see Fig. 35, and of angle section in its lower portion, see Fig. 37. The upper end of the E post is connected to the top rail 100 by an angle brace member 128 having its arms, respectively, lying against the inner surfaces of the bottoms of the channels of top rail and the E post, and welded thereto.

The lower end of the E post is secured to the offset shoulder 123 formed by the wheel housing by an angle bracket 129 having a vertically extending portion welded to the lower angle shaped end of the E post and widening downward to provide a wide base having its edge conform to the curvature of the shoulder at the edge of the wheel housing and provided with a flange fitting said shoulder and welded thereto.

The tonneau paneling 102 is applied to the tonneau framework hereinbefore described by flanging in the paneling at its lower edges and securing it to the side and rear tonneau sills. At the D post bracket, which itself forms the outer body surface, the paneling extends over its rear inclined edge merely sufficiently to make a good lap joint, the parts being welded together along this joint. In the lower portion of the D post, the tonneau paneling is applied to the outside of the post so as to have a rabbeted edge portion seated in the corresponding rabbet of the post in a manner similar to the attachment of the cowl panel to the A post. Above the belt line, as shown in Fig. 28, the paneling 102 is curved inwardly at the rear and then forwardly to form a part of the window receiving channel, and is then flanged inwardly and secured at 130 to the rear surface of the D post. At the rear of the side window openings, the paneling is similarly joined to the outside side wall and the bottom of the channel shaped E post, as shown in Fig. 35. At the top of the side window opening, the upper edge of the paneling is clinched over the outer side wall of the channel of the top rail 100 and the lower edge of the paneling is formed similarly to the formation at the D and E posts and joined to the bottom wall of the channel to provide a part of the window channel, see Fig. 27.

At the bottom of the side window openings, the paneling is turned inward, see Fig. 30, and then formed with a downward offset edge portion to provide one side and the bottom of the window receiving channel. A reinforcing strip 131 bent back upon itself and having one edge flanged laterally at 132 is brought with this flanged edge underlying the offset edge portion of the paneling and secured thereto. The ends of this reinforcing member are provided with flanges 133 and 134 fitting against and secured to the respective D and E posts. This reinforcing strip 131 affords, by its inner downwardly projecting flange 135, a means for securing the upper end of a bracing member 140 extending from the wheel housing offset shoulder 123.

At the rear window opening the paneling is turned in and offset exactly as it is turned in and offset at the bottom of the side window opening just described, whereby to form the bottom and a side of the window receiving channel. To the offset edge portion 136 at the bottom of the window openings is connected the flanged upper end of a vertical brace or supporting member 137. This member is of the channeled cross section shown in Fig. 31 to secure great strength and rigidity. Its lower end is flattened out and bent under and secured to the under side of the rear tonneau sill.

An angle-shaped cross brace 138 having vertically and horizontally extending branches is curved to conform to the rear of the tonneau and extends in the region of the belt line of the body, around from one E post to the other. The ends of this brace 138 are suitably secured as by welding the brace through its vertically extending branch to the E-posts, and its central portion is supported and secured to vertical brace 137 by an angle bracket 139 secured to said brace 137 and the horizontally extending branch of brace 138.

In the annexed claims I desire to claim all modifications of my invention which fall within the purview of its generic spirit.

What I claim and desire to secure by Letters Patent is:

1. In a pressed metal automobile body, an A-post of channel cross section, the channel presenting inwardly and having its rear wall extending inwardly beyond the forward wall and provided with a forwardly extending flange at its edge and a panel stamping wrapped around the outer and forward side of the post and extended around the inner side to close the mouth of the channel, the inner edge of said stamping being turned back upon itself to form a reinforced and smooth-finished edge and secured to the forwardly extending edge flange of the post.

2. In a pressed metal automobile body, an A-post of channel cross section, the channel presenting inwardly and having its rear wall forwardly flanged at its edge and having a door overlap receiving rabbet in its outer surface, and a panel stamping having one edge secured in said rabbet and wrapped around the outer and forward walls of the post and closing the mouth of the channel, the other edge of the panel being bent back upon itself and secured to the forwardly extending flange of said rear channel side wall.

3. In a pressed metal automobile body, a body post of inwardly presenting channel formation, and a top rail of channel formation supported thereby, the top rail being slotted to receive upward extensions of the side walls of the channel of the post and the outer bottom wall of the channel post being extended upwardly to overlap and be secured to the outside wall of the channel of the top rail.

4. In a pressed metal automobile body a body post of hollow formation having certain of its walls extended upwardly to form short projections, a top rail of angle formation having its main web slotted to receive said projections, and a reinforcing member overlying said projections and secured to the main web of the top rail on opposite sides of said post.

5. In a vehicle body, a pressed metal A-post of inwardly presenting channel section, and a unitary panel strip stamping covering the forward side and the bottom of the channel and extending across the open mouth of the same, the portion extending across the open mouth of the channel being formed with a rabbet to receive the edge of a windshield.

6. In an automobile body, a pressed metal body side post located between door openings, the main body of which is of channel formation, the channel presenting inwardly and having a substantially flat bottom in transverse section, and a relatively light gauge panel strip forming a finish and having a central portion and side portions offset from each other to form rabbets to receive the door edge overlaps, the strip being seated against the outside surface of the flat bottom of the channel of the post and having the side portions wrapped around the rounded edges of the post where the bottom joins the sides.

In testimony whereof he hereunto affixes his signature.

JOSEPH LEDWINKA.